(12) United States Patent
Lokkinen

(10) Patent No.: US 10,036,504 B2
(45) Date of Patent: Jul. 31, 2018

(54) BRANCH PIECE TO BE USED IN PIPE RENOVATION, AND METHOD FOR RENOVATING BRANCH POINT IN PIPE ASSEMBLY

(71) Applicant: Picote Oy Ltd., Porvoo (FI)

(72) Inventor: Mika Lokkinen, Porvoo (FI)

(73) Assignee: PICOTE OY LTD., Porvoo (FI)

( * ) Notice: Subject to any disclaimer, the term of this patent is extended or adjusted under 35 U.S.C. 154(b) by 0 days.

(21) Appl. No.: 15/317,741

(22) PCT Filed: Jun. 12, 2015

(86) PCT No.: PCT/FI2015/050419
§ 371 (c)(1),
(2) Date: Dec. 9, 2016

(87) PCT Pub. No.: WO2015/189475
PCT Pub. Date: Dec. 17, 2015

(65) Prior Publication Data
US 2017/0122482 A1    May 4, 2017

(30) Foreign Application Priority Data
Jun. 13, 2014 (FI) ..................................... 20145556

(51) Int. Cl.
| F16L 55/00 | (2006.01) |
| F16L 55/165 | (2006.01) |
| B32B 1/08 | (2006.01) |
| B32B 25/12 | (2006.01) |

(Continued)

(52) U.S. Cl.
CPC ............ *F16L 55/1656* (2013.01); *B32B 1/08* (2013.01); *B32B 5/028* (2013.01); *B32B 25/12* (2013.01); *F16L 55/1658* (2013.01); *F16L 55/179* (2013.01); *B32B 2250/04* (2013.01); *B32B 2262/103* (2013.01); *B32B 2307/51* (2013.01); *B32B 2307/7265* (2013.01); *B32B 2597/00* (2013.01)

(58) Field of Classification Search
CPC ............................ F16L 55/1656; F16L 55/179
USPC .. 285/15, 125.1, 128.1, 131.1, 132.1, 133.5, 285/222.1–222.5
See application file for complete search history.

(56) References Cited

U.S. PATENT DOCUMENTS

| 840,536 A | * | 1/1907 | Weir |
| 1,980,466 A | * | 11/1934 | Angeja ................... F16L 33/01 138/131 |

(Continued)

FOREIGN PATENT DOCUMENTS

| DE | 3909658 A1 | * | 10/1990 | .......... F16L 55/1656 |
| DE | 9105888 U1 | * | 10/1991 | ............ F16L 55/179 |

(Continued)

*Primary Examiner* — Aaron M Dunwoody
*Assistant Examiner* — Fannie C Kee
(74) *Attorney, Agent, or Firm* — Fasth Law Offices; Rolf Fasth

(57) ABSTRACT

The branch piece is for renovating a pipeline and has a main line pipe and at least one branch pipe connected with the main line pipe. The branch piece is elastic and has an inner sheathing, an outer sheathing and, at least on a part of the branch piece, a flexible reinforcement layer disposed between the inner sheathing and the outer sheathing. The branch piece regains its shape after compression.

7 Claims, 3 Drawing Sheets

(51) Int. Cl.
*B32B 5/02* (2006.01)
*F16L 55/179* (2006.01)

(56) References Cited

U.S. PATENT DOCUMENTS

| | | | | |
|---|---|---|---|---|
| 2,019,540 A | * | 11/1935 | Mascuch | F16L 33/00 |
| | | | | 285/114 |
| 3,381,981 A | * | 5/1968 | Wilson | F16L 33/01 |
| | | | | 285/222.4 |
| 4,729,583 A | * | 3/1988 | Lalikos | F16L 33/01 |
| | | | | 285/222.1 |
| 4,768,562 A | * | 9/1988 | Strand | F16L 55/1656 |
| | | | | 138/98 |
| 5,205,886 A | * | 4/1993 | White | B29C 63/34 |
| | | | | 138/145 |
| 5,411,060 A | * | 5/1995 | Chandler | B29C 63/34 |
| | | | | 138/103 |
| 5,915,419 A | * | 6/1999 | Tweedie | F16L 55/163 |
| | | | | 138/97 |
| 6,029,726 A | * | 2/2000 | Tweedie | B29C 63/28 |
| | | | | 156/379.6 |
| 6,361,080 B1 | * | 3/2002 | Walsh | F16L 23/024 |
| | | | | 285/222.1 |
| 2002/0158468 A1 | * | 10/2002 | Ikegami | F16L 25/0036 |
| | | | | 285/256 |

FOREIGN PATENT DOCUMENTS

| | | |
|---|---|---|
| EP | 2322836 | 5/2011 |
| EP | 2322836 | 8/2012 |
| EP | 2499414 | 4/2014 |
| JP | H0996395 | 4/1997 |
| WO | 9010032 | 9/1990 |
| WO | 2006083857 | 8/2006 |
| WO | 2011057734 | 5/2011 |

* cited by examiner

US 10,036,504 B2

BRANCH PIECE TO BE USED IN PIPE RENOVATION, AND METHOD FOR RENOVATING BRANCH POINT IN PIPE ASSEMBLY

PRIOR APPLICATIONS

This is a US national phase patent application that claims priority from PCT/FI2015/050419 filed 12 Jun. 2015, that claims priority from Finnish Patent Application No. 20145556, filed 13 Jun. 2014.

BACKGROUND OF THE INVENTION

The invention relates to renovation of pipelines, such as drainpipes, with a lining technique. The invention particularly relates to branch pieces to be used when branch points are being lined and to lining of the branch points.

Pipe systems, for example drainpipe systems of buildings, are typically renovated by replacing the pipes with completely new ones or by coating the inner surfaces of existing pipes with an appropriate coating technique and coating material. When the pipes in a building are replaced with completely new ones, often structures of the building have to be destructed by chipping, for instance, so that old pipes can be detached from the walls of the building. It is expensive, dirty and time-consuming work to destruct and rebuild wall structures. Because of the noise and dust caused by the renovation work it is often impossible to live in the premises during the renovation work.

Pipelines may also be renovated by coating the inner surfaces thereof. One technique of this sort is a so-called lining technique, in which a liner is slipped into a sewer to be repaired and is impregnated with a special epoxy resin which forms, when hardening, a continuous and leak-proof pipe that is i.a. self-supporting, acid-proof, food-grade and environmentally friendly. The wall thickness of the pipe liner is, depending on the size of the pipe, 2 to 4 mm, and its smooth inner surface guarantees excellent flow properties. The durability, environmental safety and service life of the pipe having been installed in place and hardened are comparable with corresponding properties of new pipes.

Problems in lining are caused by branch points in the pipeline, which also must be lined and made leak-proof. A prior art solution uses a branch pipe sewn of the same lining material that is used for lining the rest of the pipeline. Lining of a branch point begins by cleaning, after which the vertical pipe is lined and the lining is left to harden. The branch point is opened by drilling a hole in the lining of the vertical pipe, the branch piece being then slipped into the branch point and installed in place. Finally, the branch pipe is lined in a partly overlapping manner together with the part of the branch piece that enters the branch. When all the parts have hardened, the result of the work is inspected.

A problem with the arrangement described above is the high probability of a failed installation and a slow installation process involving multiple steps. Taking an epoxy-impregnated branch piece to the branch point and setting it in place is difficult and time-consuming. Moreover, some of the epoxy easily adheres to the pipes along the way as the branch piece is being taken to the branch point, and, as the epoxy dries, sharp epoxy spikes are left in the already lined vertical pipe, the spikes catching dirt when the sewer is used and thus blocking the pipe easily. Installing the branch pipe requires special tools whose service life extends for some installations only because they get easily caught in the drying epoxy and the tools have to be removed from pipe by force. In addition, the end result of the branch piece installation can only be inspected after the epoxy has dried and the branch piece has settled in place, so a failed installation is extremely laborious and time-consuming to remove.

BRIEF DESCRIPTION OF THE INVENTION

An object of the invention is thus to provide a branch piece and a method so as to enable the aforementioned problems to be solved. The object of the invention is achieved with a branch piece and a method that are characterized by what is stated in the independent claims. Preferred embodiments of the invention are disclosed in dependent claims.

The invention is based on using an elastic, metal-reinforced branch piece which does not need to be impregnated with epoxy and which is made in the shape of the branch point to be renovated. According to the method, the branch piece is placed into the pipe before lining and the vertical pipe is lined through the branch piece.

An advantage of the branch piece and the method of the invention is that the installation is clean, rapid and easy because the branch piece is not impregnated with epoxy. The branch piece may be properly installed in place first and only after a successful installation of the branch pipe is confirmed, lining is started. If deficiencies in the installation of the branch piece are observed, the position of the pipe can still be fixed, or the branch piece may even be replaced by an entirely new one before lining. With this procedure, the renovation of a branch point succeeds practically always.

BRIEF DESCRIPTION OF THE DRAWINGS

The invention is now described in closer detail by means of preferred embodiments and with reference to the accompanying drawings, in which.

DETAILED DESCRIPTION OF THE INVENTION

Figure 1:
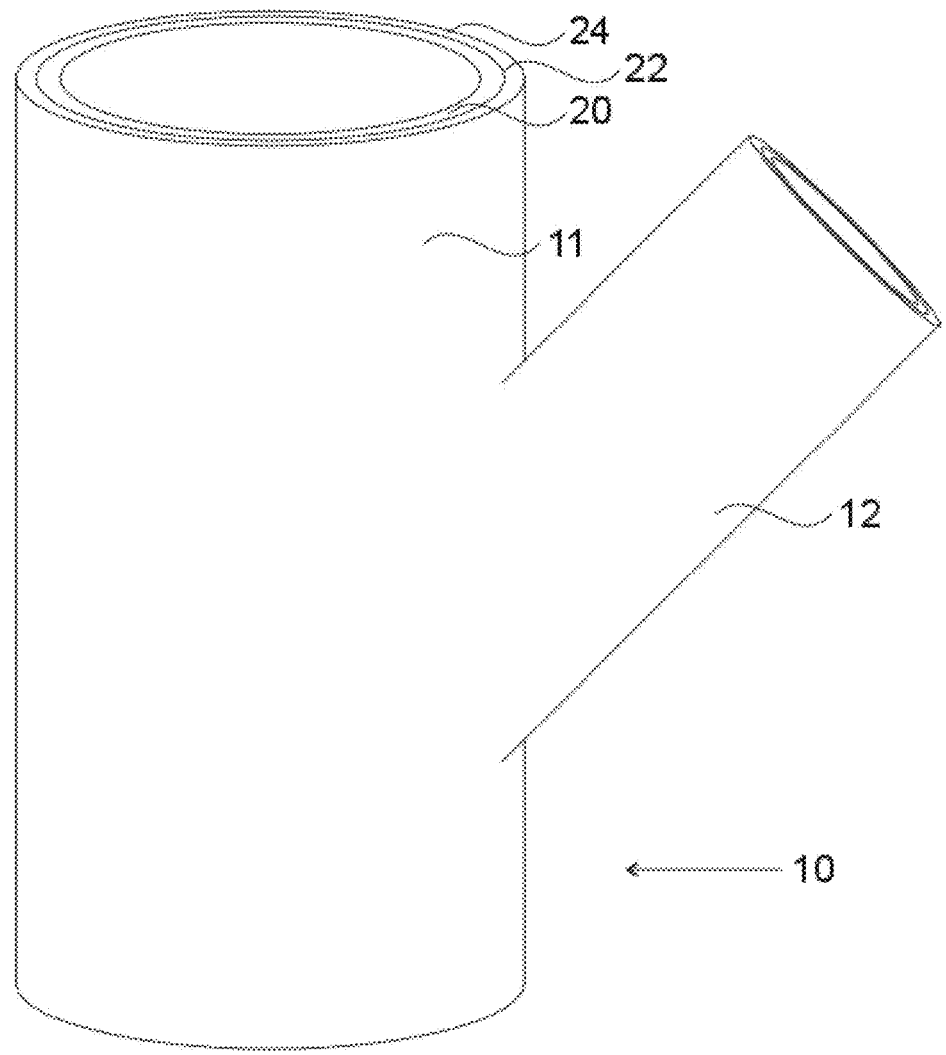
FIG. 1 shows a branch piece according to an embodiment of the invention.

With reference to FIG. 1, a branch piece 10 comprises a main line pipe 11 and a branch pipe 12. The main line pipe is typically installed to a vertical line and is therefore also sometimes referred to as a vertical pipe. However, the main line pipe 11 may also be installed to a horizontal main line or to a main line running in any orientation. One or more branch pipes 12 may be provided. FIG. 1 shows what is perhaps the most typical branch point seen in a block of flats, i.e. a so-called Y branch, in which a branch line connects with the main line at an angle of about 45 degrees. When the branch pipe 12 is a T branch, for example, it may be at an angle of 90 degrees or at almost any other angle, depending on the branch point to be renovated. A main line having a plural number of branches connecting with it on a short distance, a branch piece with a plurality of branch pipes 12 may be used or, possibly, the main line pipe 11 of the branch piece may be shortened so that all branches may be covered with their specific branch pieces without the main line pipes of the different branch pieces overlapping.

A branch piece 10 preferably comprises a three-layer structure consisting of an inner sheathing 20 and an outer sheathing 24, with a flexible reinforcement layer 22 between them. The reinforcement layer 22 preferably covers the area of the branch piece 10 entirely or almost entirely, although exceptions to this are possible. According to an embodiment, only the branch pipe 12 is provided with the reinforcement layer 22. According to an embodiment, the branch pipe 12 and the ends of the header pipe 11 are provided with the reinforcement layer 22. According to an embodiment, the reinforcement layer 22 is provided everywhere, except at the junction between the main line pipe 11 and the branch pipe 12.

The inner and outer sheathings of the branch piece are preferably of an elastic material, the branch piece 10 thus being compressible by taping or tying it with a string before it is pushed into the pipe, and the compressed piece may be taken to the branch point of renovation, where the strings or the tape is removed and the branch piece 10 tends to regain its shape. Its return to shape may be facilitated e.g. by pulling the branch pipe from the branch, using an expanding tool matching the branch piece in shape and positioning the branch piece, or by other known means. The elastic material to be used is preferably latex, although other elastic materials, such as synthetic rubber or silicone, may also be used. It is also possible to make the inner and/or outer sheathing of the branch piece of a non-elastic material, provided that the reinforcement layer is made so that it is able to return the branch piece back to its shape after the compression.

Figure 2:
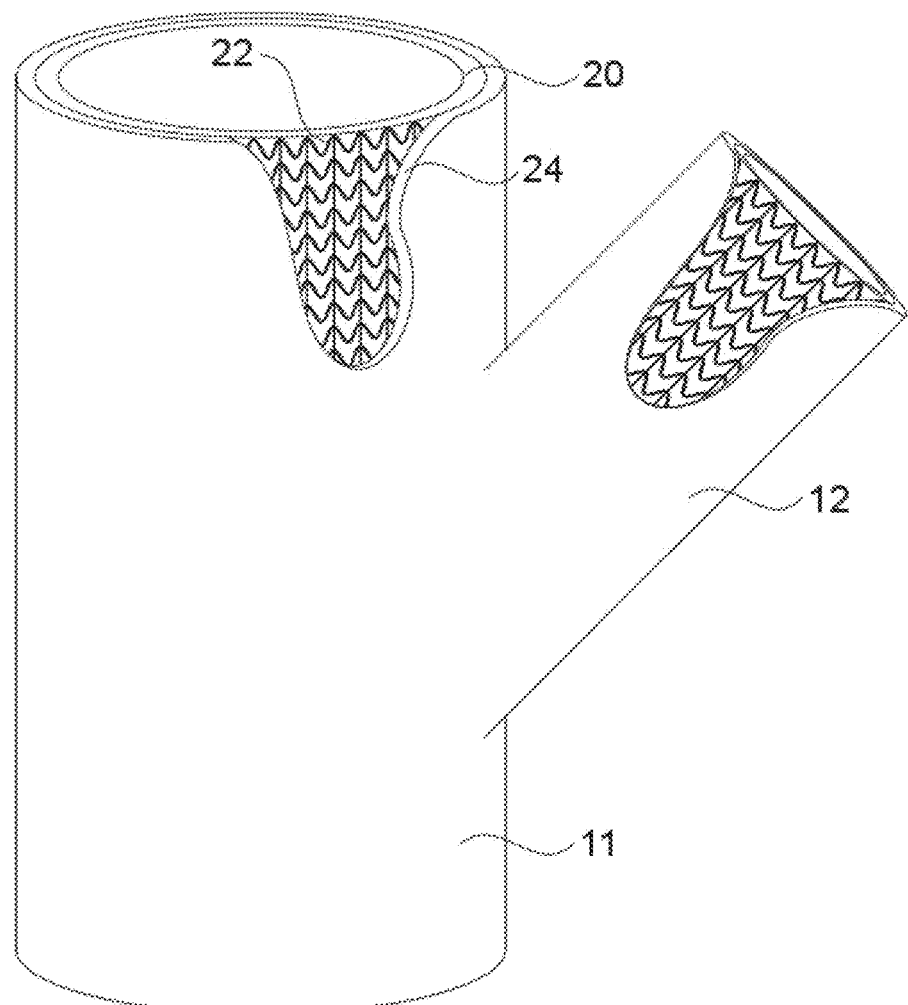
FIG. 2 shows a structure of walls of a branch piece according to an embodiment of the invention.

FIG. 2 shows a branch piece 10 according to an embodiment with its outer sheathing 24 between the main line pipe 11 and the branch pipes 12 removed, thus disclosing the structure of the piece in greater detail. According to an embodiment, the branch piece 10 is made by providing an inner sheathing 20 of latex having a thickness of about 1 to 5 mm, preferably about 2 to 4 mm. The inner sheathing may be vulcanized. Onto the inner sheathing 20, a reinforcement layer 22 made of a wire mesh, metal wires or wire cable is provided. A preferred structure for the reinforcement layer 22 is one that allows the branch piece to expand so that the diameter of the main line ripe 11, that of the branch pipe 12 or those of both the pipes may increase without the reinforcement layer being broken. According to an embodiment, the reinforcement layer 22 has a structure that does not allow the branch piece to expand so that the diameter of the main line pipe 11, that of the branch pipe 12 or those of both the pipes may increase without the reinforcement layer being broken. The structure of the reinforcement layer 22 of FIG. 2, where the reinforcements in the direction of the longitudinal axis of the pipe are straight and the reinforcements surrounding the pipe are undulating, achieves a structure that allows an increase in the diameters of the pipes but not in their length. According to an embodiment, only undulating reinforcements surrounding the pipe may be used in the reinforcement layer. The reinforcements used in the reinforcement layer are preferably wire cable, for example, because it sustains wear well and has elastic properties. Finally, an outer sheathing of latex having a thickness of about 1 to 5 mm, preferably 2 to 4 mm is provided on the reinforcement layer 22. Also, the outer sheathing may be vulcanized. Consequently, a branch piece with a reinforcement layer 22 between an elastic inner sheathing and outer sheathing 24 is obtained, the entire structure regaining its shape after compression, whereby the branch piece may be successfully taken to the branch point and easily mounted in place.

Figure 3:
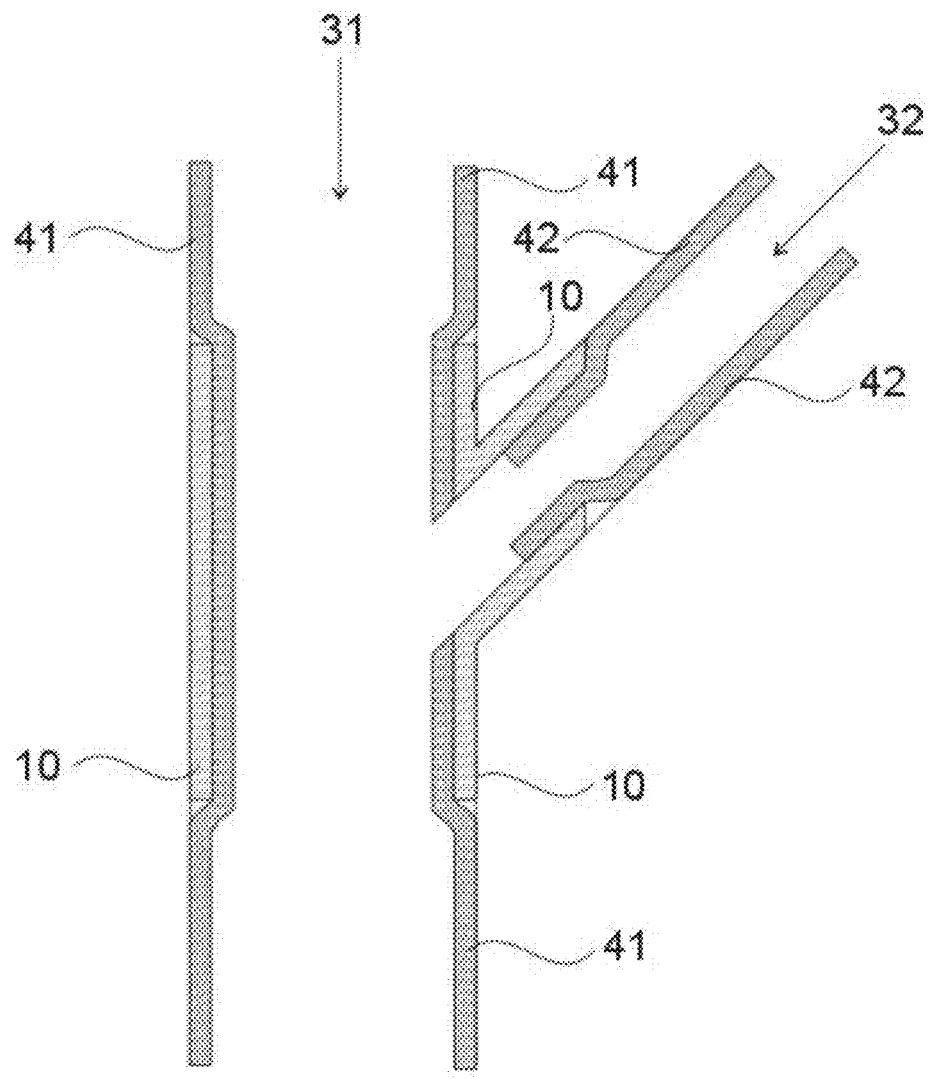
FIG. 3 shows a cross-section of a branch point renovation carried out with a branch piece according to an embodiment of the invention.

FIG. 3 shows a cross-section of a lining of a branch point of a pipeline implemented with a branch piece 10 according to an embodiment. The procedure starts by cleaning the pipeline to be installed, if necessary. The branch piece is compressed by making a fold on the branch pipe 12 side of the main line pipe 11, then pressing the branch pipe inside the fold, winding a tape or a string around the tubular piece thus obtained and, finally, slipping the piece to the branch point to be renovated. At the branch point the tape or string that keeps the branch piece compressed is removed from around the compressed branch piece, and due to its elastic properties the branch piece tends to unfold. The unfolding is assisted for example by rotating the branch piece about the longitudinal axis of the main line 31 and by moving the branch piece to and fro in the main line 31, the branch pipe of the branch piece 10 thus setting in the branch line 32 of the pipeline. To make sure that the installation of the branch piece 10 is successful, the branch point may be recorded from both lines with a camera designed for video inspection of pipelines.

When the branch piece has been installed, the main line 31, which in FIG. 3 is a vertical line, is lined as usual with a lining 41. The lining 41 in the main line 31 is opened at the branch point by drilling, grinding and/or milling a hole in the lining 41 of the main line through the branch line 32. No obstacles to the flow of sewer waste should be left between the branch line and the main line and therefore the branch line hole in the lining of the vertical line is preferably ground to be level with the branch piece. The reinforcement layer achieved inside the branch piece prevents the branch piece from getting worn out when an opening for the branch line is being worked in the lining 41 of the vertical line.

When the main line has been lined and the branch opened, the branch line 32 is lined in a normal manner so that the branch line lining 42 extends to the branch pipe of the branch piece. Preferably, the branch line lining 42 does not extend through the branch pipe all the way to the main line pipe and thus the branch line lining 42 does not need to be cut separately.

It is obvious to a person skilled in the art that as technology advances the basic idea of the invention may be implemented in many different ways. The invention and its embodiments are thus not restricted to the above-described examples but may vary within the scope of the claims.

While the present invention has been described in accordance with preferred compositions and embodiments, it is to be understood that certain substitutions and alterations may be made thereto without departing from the spirit and scope of the following claims.

I claim:

1. A branch piece for pipeline renovation, the branch piece comprising:

a main line pipe and at least one branch pipe, a sidewall of the main line pipe having a sidewall opening defined therein, the at least one branch pipe having open ends and one open end connected to the sidewall at the sidewall opening of the main line pipe so that there is fluid communication between the at least one branch pipe and the main line pipe, the branch piece comprising an elastic material and having a shape, the branch piece having an inner sheathing, an outer sheathing and, at least on a part of the branch piece, a flexible reinforcement layer disposed between the inner and the outer sheathings to enable the branch piece structure to regain the shape after compression, the branch piece comprising the flexible reinforcement layer on the at least one branch pipe between the inner and the outer sheathings thereof, wherein the flexible reinforcement layer comprises one or more wire cables.

2. The branch piece as claimed in claim 1 wherein the inner sheathing and the outer sheathing are made of an elastic material.

3. The branch piece as claimed in claim 1 wherein the inner sheathing and the outer sheathing are made of latex.

4. The branch piece as claimed in claim 1 wherein the branch piece is arranged to be compressible so that when compressed the at least one branch pipe fits into a pipe with an inner diameter that equals an outer diameter of the main line pipe.

5. A method for renovating a branch point in a pipeline, the method comprising the steps of:
providing a branch piece for pipeline renovation, the branch piece comprising:
a main line pipe and at least one branch pipe connected to the main line pipe, the branch piece comprising an elastic material and having a shape, the branch piece having an inner sheathing, an outer sheathing and, at least on a part of the branch piece, a flexible reinforcement layer disposed between the inner and the outer sheathings to enable the branch piece structure to regain the shape after compression, the branch piece comprising the flexible reinforcement layer on the at least one branch pipe between the inner and the outer sheathings thereof, wherein the flexible reinforcement layer comprises one or more wire cables;
taking the branch piece to a branch point to be renovated;
positioning the branch piece in place at the branch point so that the at least one branch pipe of the branch piece is in a branch line and the main line pipe of the branch piece is in a main line;
lining the main line so that the main line pipe of the branch piece remains between a pipe forming the main line and a lining;
opening the branch line into the main line by making a hole in the lining at the branch line; and
lining the branch line so that a lining in the branch line extends onto the at least one branch pipe of the branch piece.

6. The method as claimed in claim 5, wherein the method further comprises a step in which the installation of the branch piece is confirmed by camera inspection of the branch piece before lining of the branch line.

7. The method as claimed in claim 5, wherein the method further comprises a step in which the branch piece is compressed before the at least one branch pipe is taken to the branch point to be renovated, and wherein the branch piece is released and the branch piece then regains the shape the branch piece had before the compression.

* * * * *